(12) United States Patent
Aitchison et al.

(10) Patent No.: US 8,505,766 B2
(45) Date of Patent: Aug. 13, 2013

(54) MAGNIFIER DEVICE FOR MOUNTING TO A CONTAINER

(75) Inventors: David Jeffrey Aitchison, Phoenix, AZ (US); Jungyun Lee, Tempe, AZ (US)

(73) Assignee: Dignified Living LLC, Phoenix, AZ (US)

( * ) Notice: Subject to any disclaimer, the term of this patent is extended or adjusted under 35 U.S.C. 154(b) by 330 days.

(21) Appl. No.: 12/468,681

(22) Filed: May 19, 2009

(65) Prior Publication Data
US 2010/0294786 A1 Nov. 25, 2010

(51) Int. Cl.
*B65D 25/00* (2006.01)

(52) U.S. Cl.
USPC .......................................... 220/694; 359/823

(58) Field of Classification Search
USPC .................. 220/694; 353/76; 359/823, 613, 359/610, 609, 802
See application file for complete search history.

(56) References Cited

U.S. PATENT DOCUMENTS

| | | | |
|---|---|---|---|
| 5,119,239 A * | 6/1992 | Iaquinto et al. ............... | 359/811 |
| D333,146 S | 2/1993 | McDevitt | |
| 5,193,032 A | 3/1993 | Hirth | |
| 5,204,775 A | 4/1993 | McDevitt | |
| 5,302,279 A | 4/1994 | Degnan et al. | |
| 5,847,883 A * | 12/1998 | Rispoli, Sr. .................... | 359/802 |
| 6,081,392 A | 6/2000 | Pensmith | |
| 6,215,601 B1 * | 4/2001 | Huang .......................... | 359/802 |
| 6,549,345 B1 | 4/2003 | Cardarelli | |
| 6,594,928 B1 | 7/2003 | Clawson et al. | |
| 6,597,523 B2 * | 7/2003 | Giampavolo et al. ......... | 359/802 |
| 6,621,629 B2 | 9/2003 | Blumenthal et al. | |
| 6,621,646 B2 * | 9/2003 | Jung ............................. | 359/802 |
| 6,767,107 B1 * | 7/2004 | Leifer et al. ..................... | 362/33 |
| 6,989,948 B2 * | 1/2006 | Hussaini et al. ............... | 359/809 |
| 7,400,459 B2 * | 7/2008 | Welch ............................ | 359/802 |
| 7,911,717 B2 * | 3/2011 | Yeh et al. ....................... | 359/802 |

\* cited by examiner

*Primary Examiner* — Mickey Yu
*Assistant Examiner* — Rafael Ortiz
(74) *Attorney, Agent, or Firm* — Pillsbury Winthrop Shaw Pittman LLP (57) ABSTRACT

One aspect of the present invention provides a magnifier device for mounting to a container. The device comprises a container mount comprising a base portion and an adjustable portion. Each of the base portion and the adjustable portion comprises a container engaging surface. The container engaging surfaces are arranged for engaging a container received therebetween. The adjustable portion is mounted for movement relative to the base portion in (i) a contracting direction wherein the container engaging surfaces move relatively towards one another and (ii) an expanding direction wherein the container engaging surfaces move relatively away from one another, thus enabling receipt of containers of various sizes between the container engaging surfaces. The container mount comprises a resilient member for biasing the adjustable portion in the contracting direction, thus urging engagement of the container engaging surfaces against a container received therebetween. A magnifying lens is secured to a lens mounting part of the base portion of the container mount.

13 Claims, 10 Drawing Sheets

MAGNIFIER DEVICE FOR MOUNTING TO A CONTAINER

FIELD OF THE INVENTION

The present invention relates to a magnifier device for mounting to a container, such as a prescription medicine bottle.

BACKGROUND OF THE INVENTION

Magnifying devices for mounting to containers, such as prescription medicine bottles, are known in the art for making it easier to read the container label. Examples of such devices are shown in U.S. Pat. Nos. D333,146, 6,621,629, 6,594,928, 6,549,345, 6,081,392, 5,302,279, 5,204,775, and 5,193,032. These prior art references show numerous attempts over a number of years to provide a satisfactory device.

Figure 1:
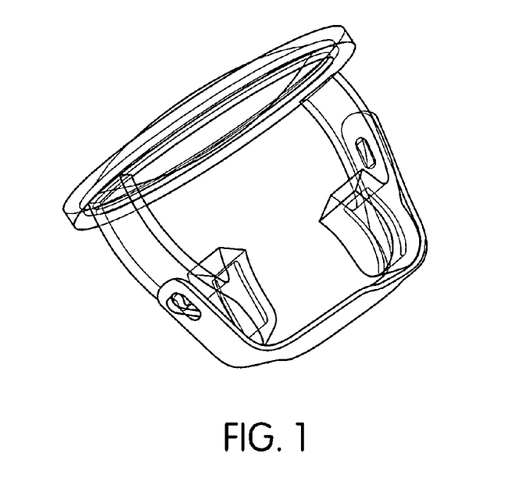
FIG. 1 shows the prior art device referenced in the Background section.
Figure 2:
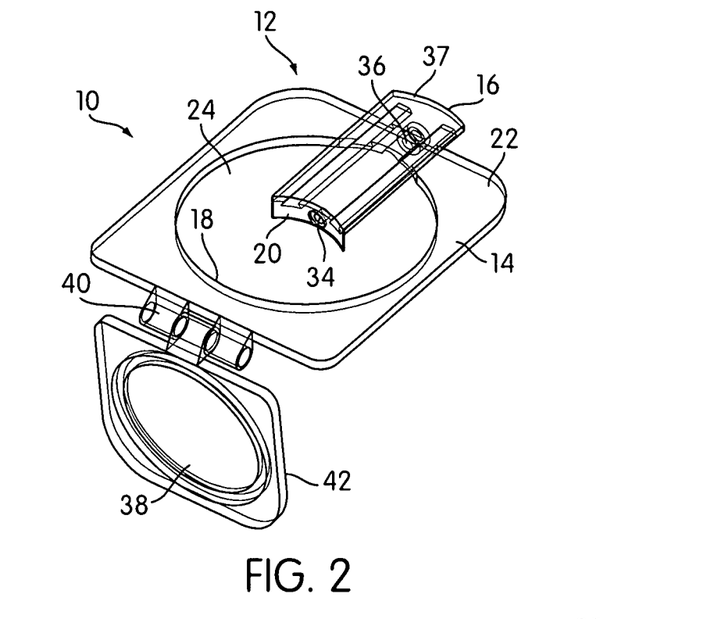
FIG. 2 is a perspective view of a magnifying device constructed in accordance with an embodiment of the invention.
Figure 3:
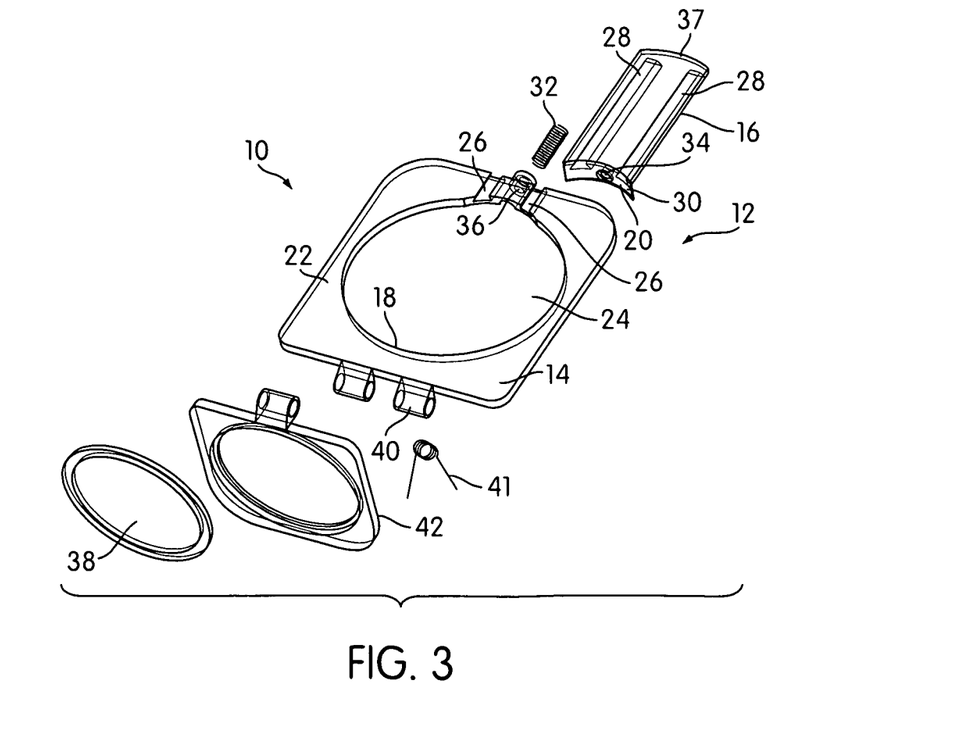
FIG. 3 is an exploded perspective view of the device of FIG. 2.
Figure 4:
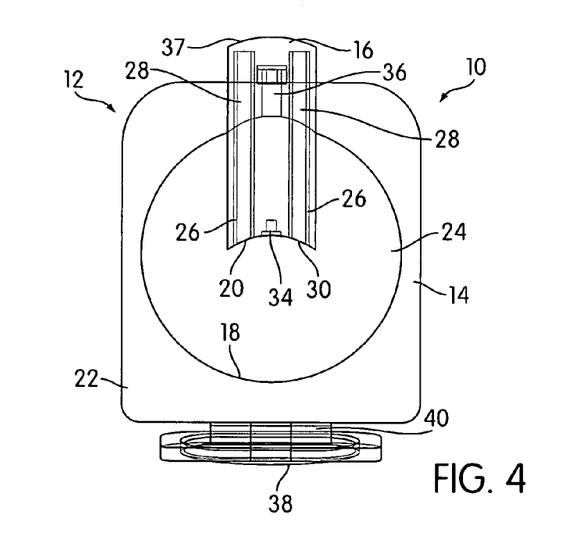
FIG. 4 is a top plan view of the device of FIG. 2.
Figure 5:
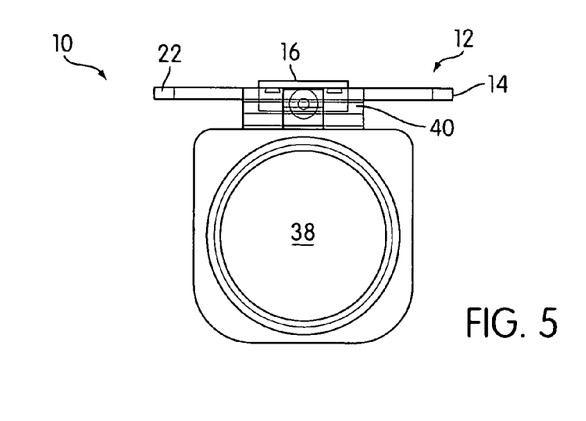
FIG. 5 is a front elevational view of the device of FIG. 2.
Figure 6:
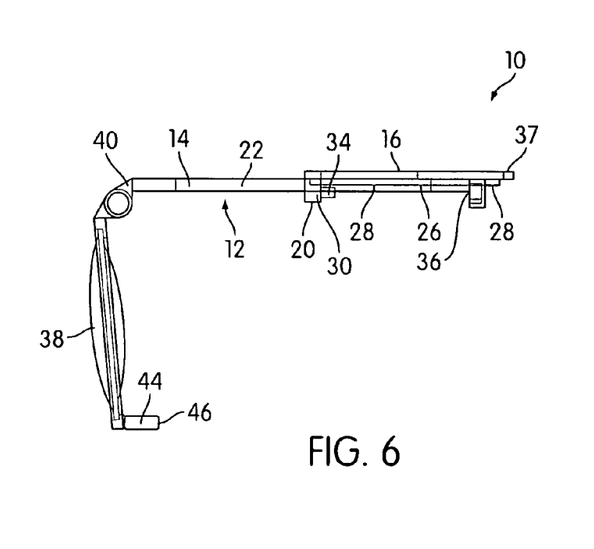
FIG. 6 is a side profile view of the device of FIG. 2.

The assignee of the present application has also sold in the prior art the magnifying device depicted in FIG. 1. That device has a pair of engaging members that grip the sides of the bottle. A rubber strap extends between the engaging members to prevent the device from being pulled forwardly off the container. This prior art device is sold in different sizes, each designed for a different size container.

SUMMARY OF THE INVENTION

One aspect of the present invention provides a magnifier device for mounting to a container. The device comprises a container mount comprising a base portion and an adjustable portion. Each of the base portion and the adjustable portion comprises a container engaging surface. The container engaging surfaces are arranged for engaging a container received therebetween. The adjustable portion is mounted for movement relative to the base portion in (i) a contracting direction wherein the container engaging surfaces move relatively towards one another and (ii) an expanding direction wherein the container engaging surfaces move relatively away from one another, thus enabling receipt of containers of various sizes between the container engaging surfaces. The container mount comprises a resilient member for biasing the adjustable portion in the contracting direction, thus urging engagement of the container engaging surfaces against a container received therebetween. A magnifying lens is secured to a lens mounting part of the base portion of the container mount, wherein the lens mounting part is fixed with respect to the container engaging surface of the base portion.

Other objects, features, and aspects of the present invention will become apparent from the following detailed description, the accompanying drawings, and the appended claims.

Another aspect of the invention provides a magnifier device for mounting to a container. The device comprises a container mount comprising a base portion and an adjustable portion. Each of the base portion and the adjustable portion being mounted for movement relative to the base portion in (i) a contracting direction wherein the container engaging surfaces move relatively towards one another an (ii) an expanding direction wherein the container engaging surfaces move relatively away from one another, thus enabling receipt of containers of various sizes between the container engaging surfaces. The container mount comprises a resilient member for biasing the adjustable portion in the contracting direction, thus urging engagement of the container engaging surfaces against a container received therebetween. A magnifying lens is pivotally mounted to a lens mounting part of the base portion. A container engaging element is spaced from the pivotal mounting of the magnifying lens and is movable with the magnifying lens. The container engaging element has a container engaging surface positioned and configured to engage the container when the magnifier device is mounted to the container to establish a spacing between the container and the magnifying lens.

DETAILED DESCRIPTION OF THE ILLUSTRATED EMBODIMENTS OF THE INVENTION

FIGS. 2-8 illustrate one non-limiting example of a magnifier device 10 for mounting to a container C, which is constructed in accordance with the invention. The device 10 is designed to be mounted to the container C, and in particular a prescription medicine bottle. The device 10 (or other devices within the scope of the invention), may be used with other types of containers. The general function of the device is to magnify the label on the container to make it easier to read the label and discern the container's contents, which is particularly important with regards to prescription medicine.

The device 10 comprises a container mount, generally indicated at 12. The container mount 12 is the structure designed for mounting the device 10 to the container C in an operative, use position. The container mount 12 comprises a base portion, generally indicated at 14, and an adjustable portion, generally indicated at 16. Each of the base portion 14 and the adjustable portion 16 comprises a container engaging surface 18, 20, respectively. The container engaging surfaces 18, 20 are arranged for engaging a container C received vertically therebetween, as will be described below. Generally, the container mount 12 may have any suitable construction or configuration, and the illustrated embodiment is not intended to be limiting.

The adjustable portion 16 is mounted for movement relative to the base portion 14 in (i) a contracting direction wherein the container engaging surfaces 18, 20 move relatively towards one another and (ii) an expanding direction wherein the container engaging surfaces 18, 20 move relatively away from one another. This enables receipt of containers C of various sizes between the container engaging surfaces 18, 20, as will be described below.

In this embodiment, the base portion 14 has a body 22 encircling a container receiving opening 24. The container receiving opening 24 is illustrated as being circular, but may have other shapes or configurations. The container engaging surface 18 of the base portion 14 is a front portion of the container receiving opening 24. That is, it is a portion of the body 22 that defines a front portion of the opening 24, as shown in the Figures. The body 22 has an overall square configuration, but that configuration is not limiting and any shape or configuration may be used.

The adjustable portion 16 is movably mounted to a rear portion of the body 22 of the base portion 14 opposite the container engaging surface 18 of the base portion 14. The adjustable portion 16 extends forwardly into the container receiving opening 24, and the container engaging surface 20 of the adjustable portion 16 faces forwardly into the container receiving opening 24. The container engaging surface 20 of the adjustable portion 16 is provided on a flange 30 that depends downwardly from a front end of the adjustable portion 16.

As can be seen in the Figures, the body 22 of the base portion 14 has a pair of tracks 26, and the adjustable portion 16 has a pair of slider members 28 that slidably mount in the tracks 26. In the illustrated embodiment, the tracks 26 and slider members 28 have corresponding trapezoidal cross-sections to permit sliding movement in the contracting and expanding directions, but prevent withdrawal upwardly through the open tops of the tracks 26.

The adjustable portion 16 may have any construction or configuration and may be mounted to the base portion in any manner. The illustrated embodiment is not limiting.

The container mount 12 also comprises at least one resilient member 32 for biasing the adjustable portion 16 in the contracting direction, thus urging engagement of the container engaging surfaces 18, 20 against a container C received therebetween (see FIGS. 7A-8C). In the illustrated embodiment, the resilient member 32 is mounted between the adjustable portion 16 and the base portion 12 so as to bias the adjustable portion 16 forwardly into the container receiving opening 24. The resilient member 32, as an example, is a coil spring mounted between a post 34 provided beneath the adjustable portion 16 and an opposing post 36 provided beneath and at the rear of the body 22 of the base portion 14. The posts 34 and 36 are received within the coils of the spring 32, and the spring 32 is compressed so as to bias the adjustable portion 16 in the contracting direction (i.e., forwardly) relative to the base portion 14. The type, position, and arrangement of the resilient member 32 is not intended to be limiting, and any resilient member or mounting may be used.

The adjustable portion 16 also has a rear portion 37 projecting rearwardly of the base portion 14. This provides for manual grasping to allow the adjustable portion 16 to be grasped by its rear portion 37 and manually moved rearwardly against the biasing of the resilient member 32 for accommodating receipt of the container C in the container receiving opening. The adjustable portion 16 may be moved as much as required to permit receipt of containers of different sizes, as will be discussed below with respect to FIGS. 7A-8C.

A magnifying lens 38 is secured to a lens mounting part 40 of the base portion 14 of the container mount 12. The lens mounting part 40 is fixed with respect to the container engaging surface 18 of the base portion 14, for purposes which will be described below.

Figure 7A:
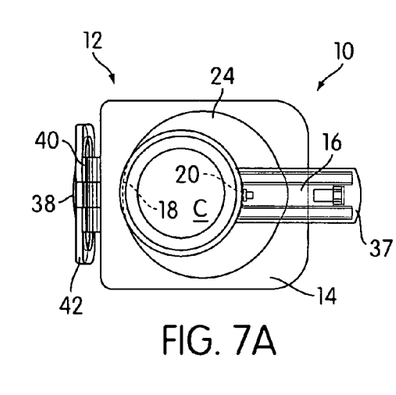
FIG. 7A-7C are top plan views of the device of FIG. 2 mounted to three containers of varying sizes.
Figure 7B:
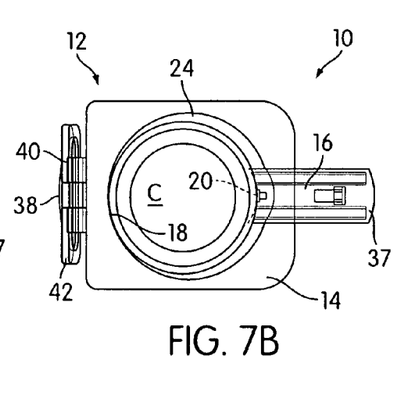
Figure 7C:
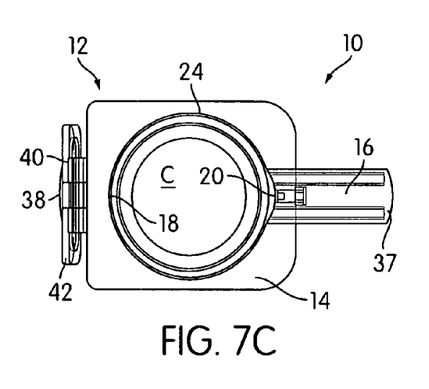
Figure 8A:
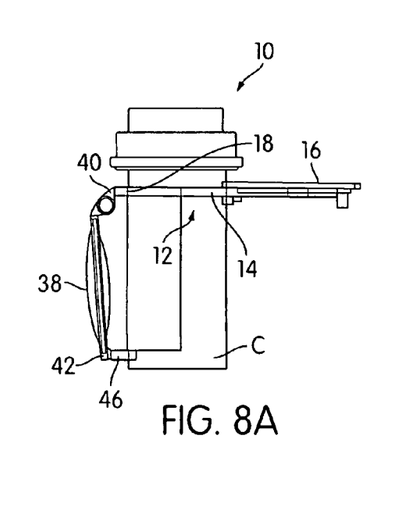
FIGS. 8A-8C are side profile views corresponding to FIGS. 7A-7C.
Figure 8B:
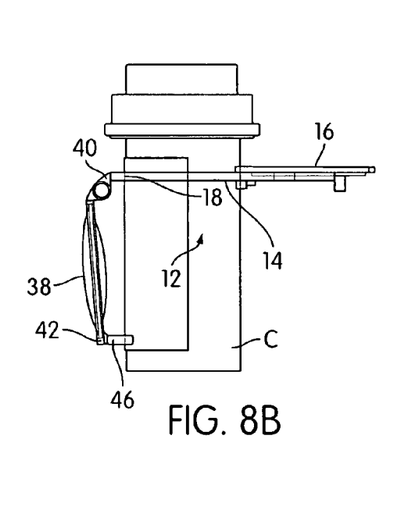
Figure 8C:
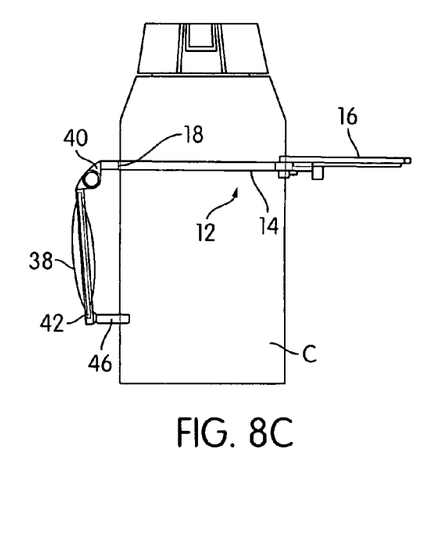
Figure 9:
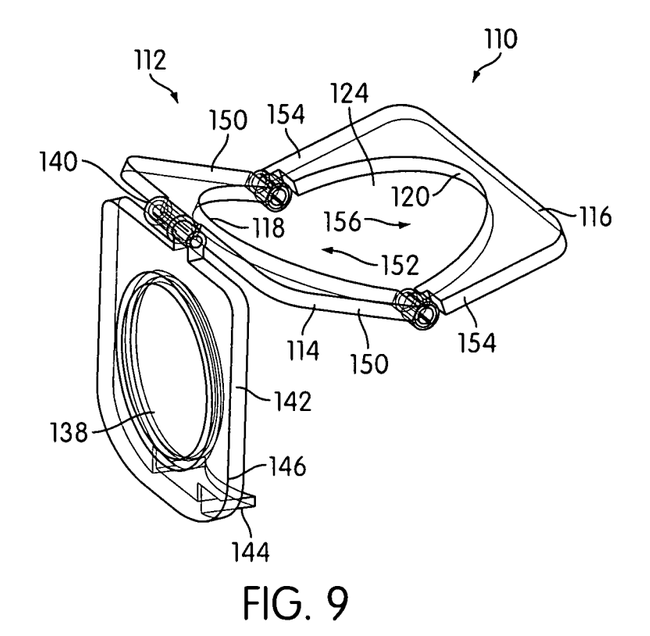
FIG. 9 is a perspective view of a magnifying device constructed in accordance with another embodiment of the invention.
Figure 10:
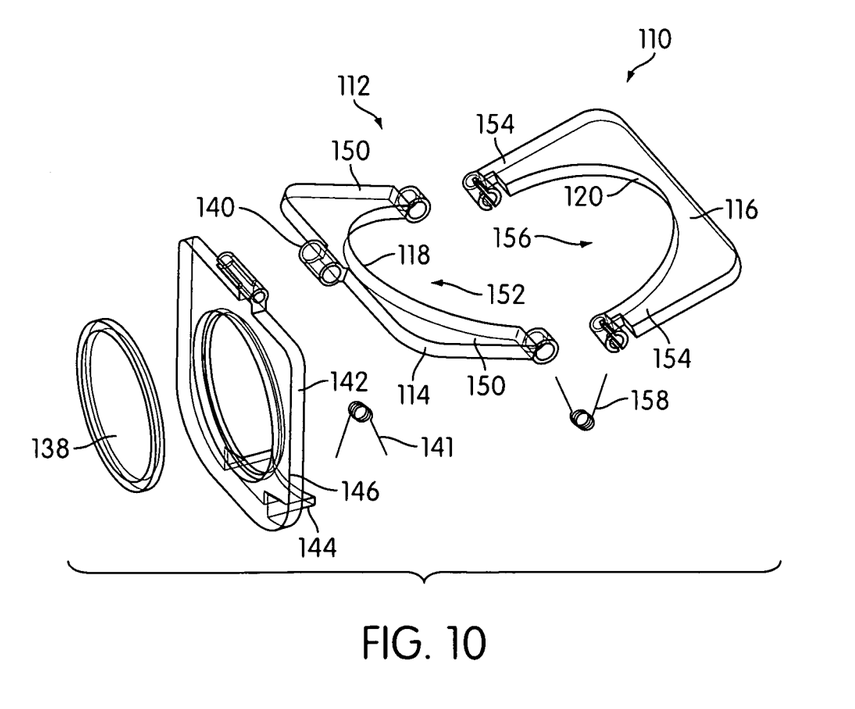
FIG. 10 is an exploded perspective view of the device of FIG. 9.
Figure 11A:
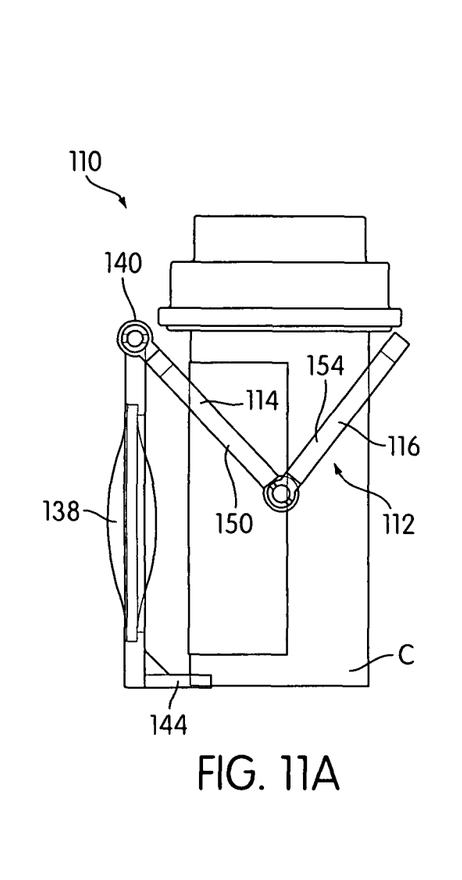
FIGS. 11A and 11B are side profile views of the device of FIG. 9 mounted to two containers of varying sizes.
Figure 11B:
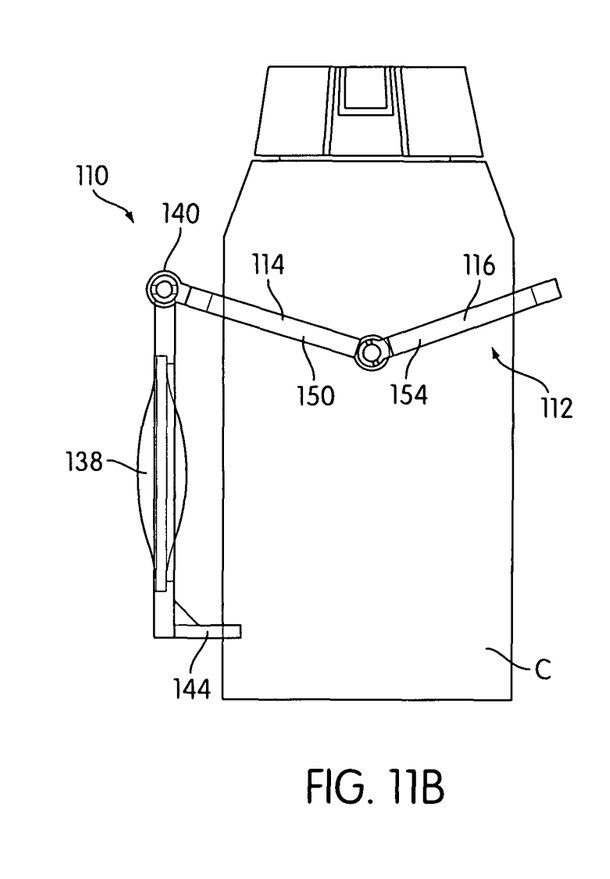
Figure 12:
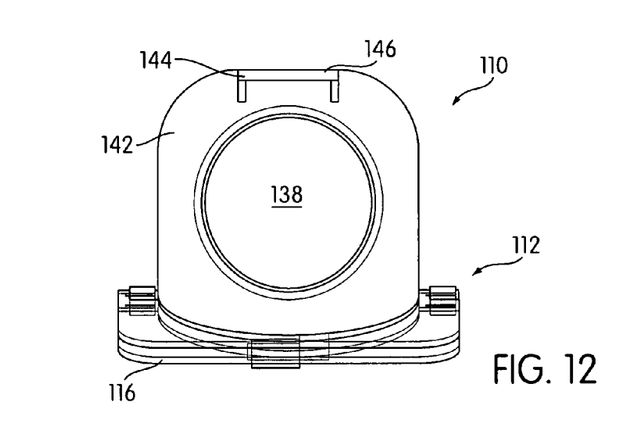
FIG. 12 is a rear elevational view of the device of FIG. 9.
Figure 13:
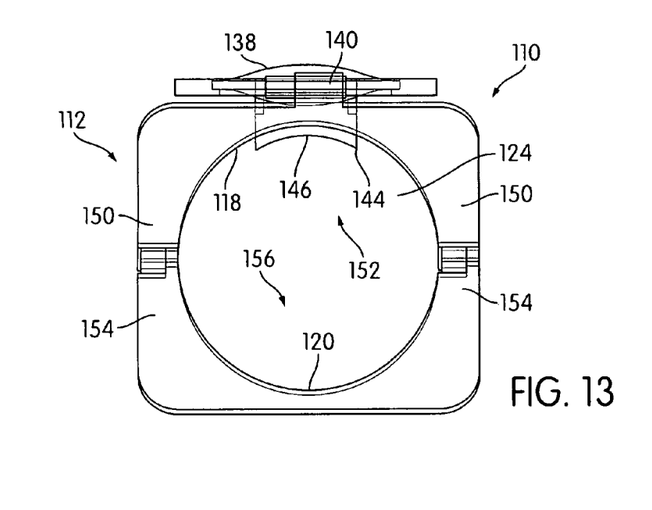
FIG. 13 is a top plan view of the device of FIG. 9.
Figure 14:
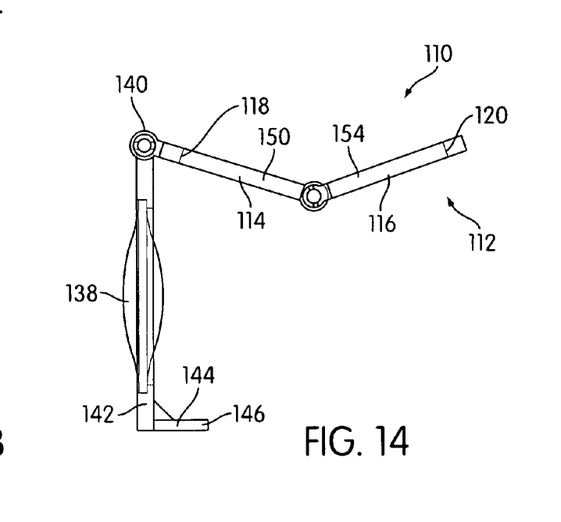
FIG. 14 is a side profile view of the device of FIG. 9.
Figure 15:
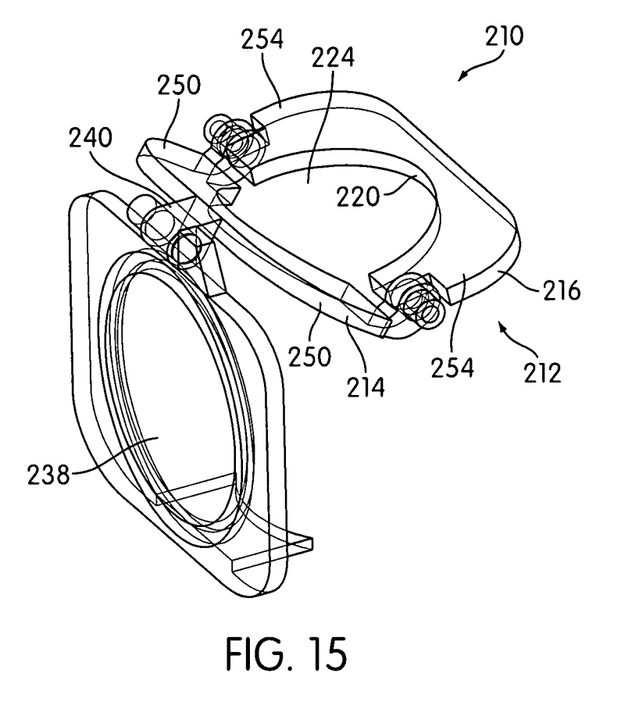
FIG. 15 is a perspective view of a magnifying device constructed in accordance with yet another embodiment of the invention.
Figure 16:
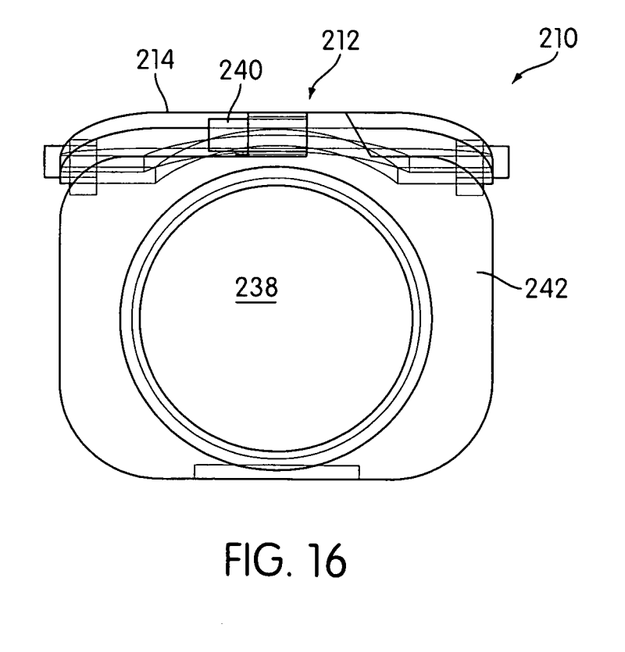
FIG. 16 is a front elevational view of the device of FIG. 15.
Figure 17:
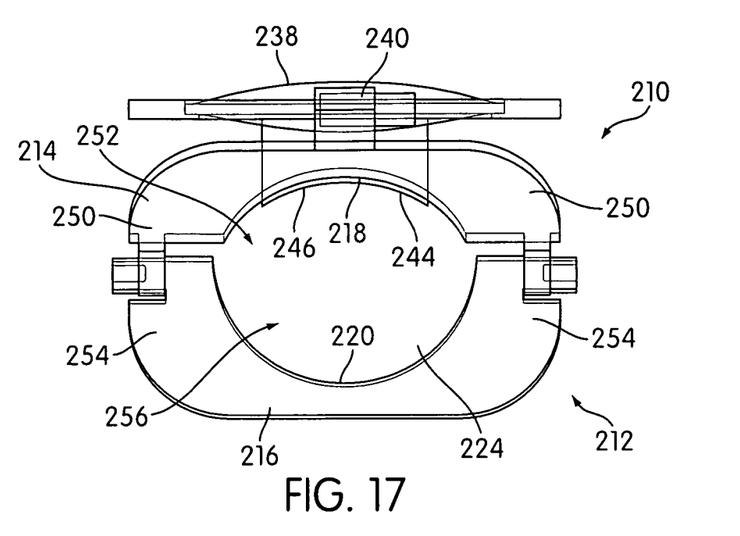
FIG. 17 is a top plan view of the device of FIG. 15.
Figure 18:
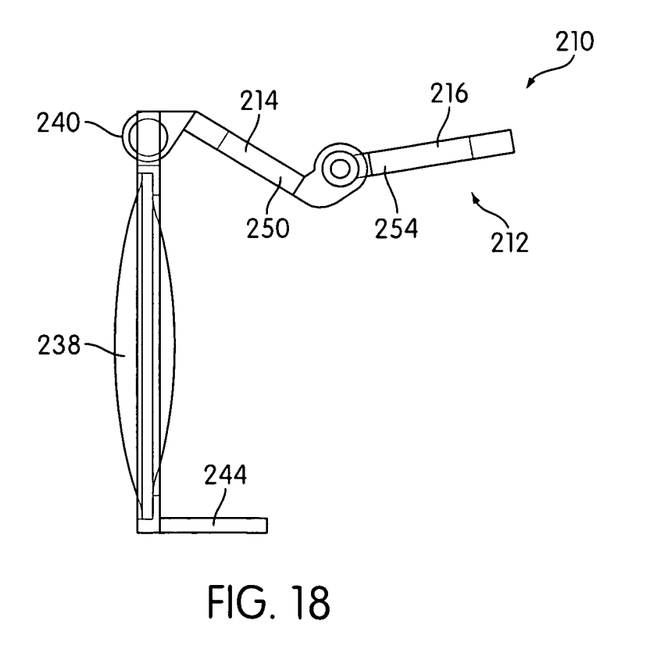
FIG. 18 is a side profile view of the device of FIG. 15.
Figure 19:
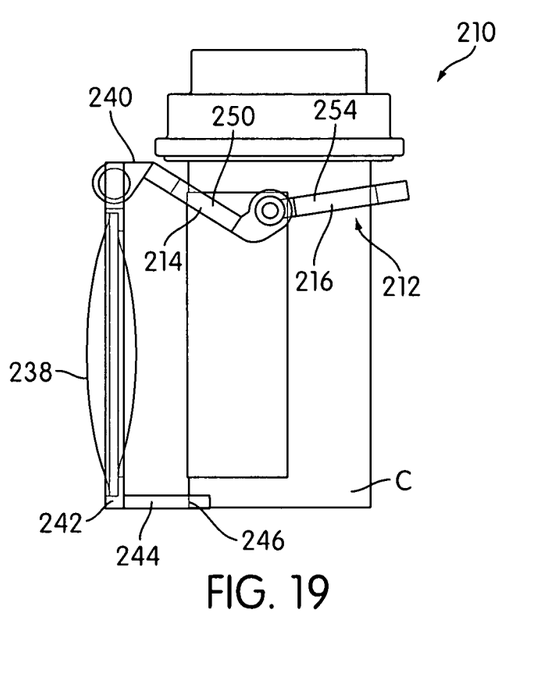
FIG. 19 is a side profile view of the device of FIG. 15 mounted to a container.

As can be seen in FIGS. 7A-8C, the device 10 can be mounted to containers of varying sizes, such as cylindrical containers of varying diameter. FIGS. 7A and 8A are views of the device 10 mounted to a container C of a smaller size, FIGS. 7B and 8B are views of the device 10 mounted to a container C of a medium size, and FIGS. 7C and 8C are views of the device 10 mounted to a container C of a larger size. When mounted on any of the sizes, the container engaging surface 18 of the base portion 14 is engaged with the vertical wall of the container C. Because the lens mounting part 40 is fixed with respect to the container engaging surface 18, this ensures the same distance relationship can be maintained between the lens mounting part 40 and the lens 38 thereon. This advantageously enables the lens 38, which has a fixed focal length, to have the same or essentially the same distance relationship with respect to the container C (and particularly its label), which ensures that the focusing of the lens can be the same or essentially the same irrespective of whether the container C is small, large, or in between. That is, the relationship between the container engaging surface 18 of the base portion 14 and the lens mounting part 40 remains fixed so that the lens 38 can be consistently positioned at the same or essentially the same distance and orientation relative to the container C, and the adjustable portion 16 moves to accommodate the different sizes of containers C.

This is distinct and advantageous over magnifying devices that grab the lateral sides of the container C, such as is shown in FIG. 1. With that type of device, because the contact is at the sides, the distance between the lens and the container will vary more significantly based on the size/diameter of the container C. This means that the focal length of the lens may match one size, but not other sizes.

Preferably, but not necessarily, the container engaging surface 18 of the base portion 14 is curved. The curvature may be in the range of 0.5 to 1.75 inches in radius. Preferably, the curvature is greater than or equal to the curvature of the largest container to be accommodated by the device 10, thus ensuring consistent engagement between the container C and the container engaging surface 18 of the base portion 14. Similarly, the container engaging surface 20 of the adjustable portion 16 may also optionally be curved.

The container engaging surfaces 18, 20 in this embodiment, or in any other embodiment, may have any construction or configuration, and the disclosed examples are not intended to be limiting. In the illustrated embodiment, the magnifying lens 38 is pivotally mounted to the lens mounting part 40 for movement between a use position and a storage position. Preferably, but not necessarily, the lens 38 is mounted to a frame 42 that is pivotally mounted to the lens mounting part 40, such as by a hinge pin, posts, or any other suitable pivotal mounting. As a result, the device 10 can be folded for storage, and extended to the position shown for use. Even though the lens 38 is pivotally mounted and its pivotal position may vary, the fixed relation between the lens mounting part 40 and the container engaging surface 18 of the base portion 14 ensures that the distance relation between the lens 38 and the container C is not affected by container size. Preferably, the focal length is selected to match the distance between the lens 38 and the container C when the device 10 is mounted to the container and the lens 38 is positioned substantially parallel to the vertical face of the container C, as illustrated in FIGS. 7A-8C.

As an option, the frame 42 has a container engaging element 44 spaced from the pivotal mounting thereof, shown at its lower end. The container engaging element 44 has a container engaging surface 46 positioned and configured to engage the container C when the magnifier device 10 is mounted to the container C and the lens 38 is pivoted to the use position. The container engaging surfaces 46 and 20 of the container engaging element 44 and the base portion 14 are positioned and configured to be aligned along a vertical axis when the magnifier device 10 is mounted to the container and the lens 38 is in the use position, thus enabling the container engaging surfaces 20, 46 to both contact a vertical wall of the container C. Preferably, the lens 38 is mounted in the frame 42 so as to be substantially parallel to the vertical axis when the magnifier device 10 is mounted to the container and the lens is in the use position. Preferably, the container engaging element 44 extends perpendicularly to the lens 38.

Optimal spring 141 is mounted to bias the frame 42 towards a folded position. This also ensures that the frame 42 is biased so as to urge the container engaging element 44 into contact with the container.

In other embodiments, instead of being pivotally mounted, the magnifying lens 38 is fixedly mounted to the lens mounting part 40. Thus, the lens mounting part 40 need not be a pivotal mount, and can be any structure that mounts the lens 38 to the base portion 14.

FIGS. 9-14 and FIGS. 15-19 show a second embodiment 110 and a third embodiment 210, respectively, each constructed in accordance with the invention. Because these second and third embodiments are structurally and functionally similar, they are discussed together. The main difference between the second and third embodiments is the size of containers with which they can be used; the second embodiment is for a range of larger containers, and the third embodiment is for a range of smaller containers. Where common structures are used throughout the embodiments, similar reference numbers will be used (e.g., 12, 112, and 212 refers to the container mount of all three embodiments, 14, 114, and 214 refers to the base portion of all three embodiments, etc.).

Each of the devices 110, 210 of the second and third embodiments is constructed such that the base portion 114, 214 has a pair of arms 150, 250 extending from opposing lateral sides thereof on opposing sides of a recess 152, 252 of the base portion 114, 214. The adjustable portion 116, 216 also has a pair of arms 154, 254 extending from opposing lateral sides of a recess 156, 256 of the adjustable portion 116, 216. The arms 150, 250 and 154, 254 of the base portion 114, 214 and the adjustable portion 116, 216 are pivotally connected together such that the base portion 114, 214, the adjustable portion 116, 216, and the arms 150, 250 and 154, 254 thereof encircle a container receiving opening 124, 224. Thus, the container receiving opening 124, 224 comprises the recesses 152, 252 and 156, 256 of the base portion 114, 214 and the adjustable portion 116, 216. In the illustrated embodiment, each of the base and adjustable portions defines a part of (approximately half) the container receiving opening. The pivotal connections between the arms may be made in any suitable manner, such as the posts and sockets illustrated. Other constructions, configurations, or variations may also be used, and the illustrated embodiments are not limiting.

The container engaging surface 118, 218 of the base portion 114, 214 is a front portion of the recess 152, 252 thereof, and the container engaging surface 120, 220 is a rear portion of the recess 156, 256 thereof.

The resilient member is in the non-limiting form of a torsion spring 158 (the torsion spring is not shown in the third embodiment for clarity purposes). The torsion spring is mounted at the pivotal connections of the arms 150, 250 and 154, 254 in any known manner to provide a biasing action between the arms. Specifically, the springs(s) is/are constructed to bias the adjustable portion 116, 216 in the contracting direction so as to pivot the base portion 114, 214 and adjustable portion 116, 216 with the container engagement surfaces 118, 218 and 120, 220 moving towards one another. This urges engagement of the container engaging surfaces against a container C received therebetween.

With the construction based on a pivotal connection, the adjustability accommodate containers C of various sizes is provided by the relative pivoting between the adjustable portion 116, 216 and the base portion 114, 214. However, the relationship between the container engaging surface 118, 218 and the lens mounting part 140, 240 remains the same or essentially the same to serve the same purpose as discussed above with respect to the first embodiment. Thus, it is the adjustable portion 116, 216 that moves in a relative sense to accommodate containers C of varying sizes. This can be best appreciated from FIGS. 11A and 11B with regard to the second embodiment, and FIG. 19 with regard to the third embodiment.

The lens 138, 238, lens mounting part 140, 240, frame 142, 242, and container engaging element 144, 244 with its container engaging surface 146, 246 are constructed and function essentially the same as the first embodiment described above. Thus, that description is not repeated.

Preferably, any embodiment of the invention is constructed to fit on cylindrical containers with a diameter between 1 to 3.5 inches, and more preferably 1.25 to 2.5 inches. That is, the container engaging surfaces of the base and adjustable portions may move to accommodate diameters in that range and still maintain the relationship described above between the lens mounting part and the container engaging surface of the base portion. Other ranges and sizes may also be accommodate in other variations of the invention.

The foregoing illustrated embodiments have been provided solely to illustrate the structural and functional principles of the present invention, and should not be regarded as limiting. To the contrary, the present invention covers all modifications, alterations, substitutions and equivalents within the spirit and scope of the following claims.

What is claimed:

1. A magnifier device for mounting to a container, comprising:
   a container mount comprising a base portion and an adjustable portion, each of the base portion and the adjustable portion comprising a container engaging surface, the container engaging surfaces being arranged for engaging a container received therebetween;
   the adjustable portion being mounted for movement relative to the base portion in (i) a contracting direction wherein the container engaging surfaces move relatively towards one another and (ii) an expanding direction wherein the container engaging surfaces move relatively away from one another, thus enabling receipt of containers of various sizes between the container engaging surfaces, the expanding and contracting directions corresponding to a diameter of the container;
   the container mount comprising a resilient member for biasing the adjustable portion in the contracting direction, thus urging engagement of the container engaging surfaces against a container received therebetween;

a magnifying lens secured to a lens mounting part of the base portion of the container mount, wherein the lens mounting part is fixed with respect to the container engaging surface of the base portion and fixedly determines a spacing between an external vertical surface of the container and the lens oriented in a vertical direction substantially perpendicularly to the expanding and contracting directions to establish an essentially fixed distance between the lens and the external vertical surface of the container;

a hinge pivotally mounting the magnifying lens to the lens mounting part solely for pivotal movement about a pivot axis between a use position oriented in the vertical direction substantially perpendicularly to the expanding and contracting directions and a storage position, wherein the hinge restricts the movement of the magnifying lens between the use and storage positions to said pivotal movement about said pivot axis;

a container engaging element spaced from the pivotal mounting of the magnifying lens by the hinge and movable with the magnifying lens, the container engaging element having a container engaging surface positioned and configured to engage the container when the magnifier device is mounted to the container and the lens is pivoted about said pivot axis to the use position such that the container engaging element cooperates with the lens mounting part to fixedly determine the spacing between the lens oriented in the vertical direction to establish the essentially fixed distance between the lens and the external vertical surface of the container.

2. A magnifier device according to claim 1, wherein the container engaging surface of the base portion is curved.

3. A magnifier device according to claim 2, wherein a curvature of the engaging surface of the base portion is at least 0.5 inches in radius.

4. A magnifier device according to claim 1, wherein the lens is mounted to a frame that is pivotally mounted to the lens mounting part by said hinge to provide the pivotal movement of the magnifying lens, the frame having said container engaging element spaced from the pivotal mounting thereof at said hinge.

5. A magnifier device according to claim 4, wherein the container engaging element extends perpendicularly to the lens.

6. A magnifier device according to claim 1, wherein:

the base portion has a body encircling a container receiving opening, the container engaging surface of the base portion being a front portion of the container receiving opening, wherein the adjustable portion is a movably mounted to a rear portion of the body of the base portion opposite the container engaging surface of the base portion and extending forwardly into the container receiving opening, the container engaging surface of the adjustable portion facing forwardly into the container receiving opening, and wherein the resilient member is mounted between the adjustable portion and the base portion so as to bias the adjustable portion forwardly into the container receiving opening.

7. A magnifier device according to claim 6, wherein the container receiving opening is circular.

8. A magnifier device according to claim 6, wherein the adjustable portion has a rear portion projecting rearwardly of the base portion for manual grasping to allow the adjustable portion to be grasped and manually moved rearwardly against the biasing of the resilient member for accommodating receipt of the container in the container receiving opening.

9. A magnifier device according to claim 6, wherein the adjustable portion is slidably mounted to the base portion.

10. A magnifier device according to claim 8, wherein the adjustable portion is slidably mounted to the base portion.

11. A magnifier device according to claim 1, wherein the base portion has a pair of arms extending from opposing lateral sides thereof on opposing sides of a recess of the base portion, and wherein the adjustable portion has a pair of arms extending from opposing lateral sides of a recess of the adjustable portion, the arms of the base portion and the adjustable portion being pivotally connected together such that the base portion, the adjustable portion, and the arms thereof encircle a container receiving opening comprising the recesses of the base portion and the adjustable portion, the container engaging surface of the base portion being a front portion of the recess thereof, and the container engaging surface being a rear portion of the recess thereof, wherein the resilient member is constructed to bias the adjustable portion in the contracting direction so as to pivot the base and adjustable portions with the container engagement surfaces moving towards one another, thus urging engagement of the container engaging surfaces against a container received therebetween.

12. A magnifier device according to claim 11, wherein the resilient member is at least one torsion spring mounted at a pivotal connection of the arms of the base and adjustable portions.

13. A magnifier device for mounting to a container, comprising:

a container mount comprising a base portion and an adjustable portion, each of the base portion and the adjustable portion comprising a container engaging surface;

the adjustable portion being mounted for movement relative to the base portion in (i) a contracting direction wherein the container engaging surfaces move relatively towards one another an (ii) an expanding direction wherein the container engaging surfaces more relatively away from one another, thus enabling receipt of containers of various sizes between the container engaging surfaces, the expanding and contracting directions corresponding to a diameter of the container;

the container mount comprising a resilient member for biasing the adjustable portion in the contracting direction, thus urging engagement of the container engaging surfaces against a container received therebetween;

a magnifying lens pivotally mounted to a lens mounting part of the base;

a container engaging element spaced from the pivotal mounting of the magnifying lens and movable with the magnifying lens, the container engaging element having a container engaging surface and configured to engage the container when the magnifier device is mounted to the container to establish a spacing between the container and the magnifying lens;

wherein the lens mounting part is fixed with respect to the container engaging surface of the base portion so that the lens mounting part and the container engaging element fixedly determine a spacing between an external vertical surface of the container and the lens oriented in a vertical direction substantially perpendicularly to the expanding and contracting directions to establish an essentially fixed distance between the lens and the external vertical surface of the container;

a hinge pivotally mounting the magnifying lens to the lens mounting part solely for pivotal movement about a pivot axis between a use position oriented in the vertical direction substantially perpendicularly to the expanding and contracting directions and a storage position, wherein the hinge restricts the movement of the magnifying lens between the use and storage positions to said pivotal movement about said pivot axis.

* * * * *